UNITED STATES PATENT OFFICE.

JACOB W. DECASTRO, OF NEW YORK, N. Y.

IMPROVEMENT IN THE DEFECATION, DECOLORIZATION, AND REFINING OF SACCHARINE LIQUIDS.

Specification forming part of Letters Patent No. 209,608, dated November 5, 1878; application filed October 9, 1878.

*To all whom it may concern:*

Be it known that I, JACOB WILLIAM DECASTRO, of the city of New York, in the county of New York and State of New York, have invented certain new and useful Improvements in the Defecation, Decolorization, and Refining of Saccharine Solutions; and I do hereby declare that the following is a full, clear, and exact description thereof, which will enable others skilled in the art to which it appertains to make and use the same.

The object of this invention is, first, to effect the defecation and decolorization of those saccharine solutions which contain coloring matter; and, second, to prevent the formation of coloring matter in recently-expressed saccharine juices.

The means and process for carrying out my invention are based upon the utilization of the properties possessed by those organic substances which have the power of reducing nitrates in solution to nitrites and completely decomposing the latter, such reaction being especially noticed with fungi in general, animal charcoal or bone-black, and also blood-corpuscles. I thus take advantage of an alkaline base, set free by the decomposition of the nitrate in the nascent state, for taking up the coloring matter contained in the saccharine solution, and at the same time I also take advantage of the power which nitrates possess of completely coagulating albuminous substances in either the recently-expressed saccharine juice or in saccharine solutions undergoing defecation—*i. e.*, while the albuminous matter has the property of decomposing the nitrate, the nitrate, on the other hand, has the property of coagulating the albuminous matter either already contained in the recently-expressed saccharine juices or which has been added to saccharine solutions for purposes of reaction. It thus becomes evident that the defecation in either operation is rendered complete, free from impurities, and totally prevents the colorization of saccharine solutions during evaporation.

Any nitrates may be used to accomplish the object I have in view which are capable of decomposition by organic substances, and in this connection it is obvious that the metallic nitrates may be used with advantage, always, of course, selecting such as will not be prejudicial to health. I have tried nitrate of tin and nitrate of zinc, to the latter of which, and especially when it is in a neutral or basic condition, I give the preference. I may also use nitrates of alkalies or alkaline earths; but in this case I rely upon the filtration through bone-black for the detection of their effect; and, finally, I may employ the nitrate of albumen.

In conjunction with the use of nitrates and albuminous matters, earthy alkalies or the sulphides of the alkalies or alkaline earths can be used to great advantage, which I intend to make the subject of another application.

The object of the operation of defecation or clarification of saccharine solutions is to extract the mechanically-suspended impurities, and with the application of my invention I not only accomplish this purpose, but I also extract the greatest portion of the coloring matter in one operation.

In order to enable those skilled in art to apply my invention, I will proceed to describe my process.

For the treatment of those kinds of raw sugar which already contain coloring matter, the raw sugar is dissolved in water to a density of about 30° Baumé, as is the usual practice in a sugar refinery, and the solution is introduced into defecating-pans, or blow-ups, or tanks. Then the solution is tested with litmus paper to ascertain whether it gives an acid reaction. In case the reaction is acid the solution may be neutralized or rendered slightly alkaline with milk of lime or other suitable alkaline substance. After having done this I add a quantity of (preferably neutral) nitrate of zinc, the amount to be added depending altogether upon the amount of albuminous and coloring matter contained in such solution. In general practice I add about one-tenth of one per cent. of the weight of the solid saccharine matter contained in the solution. The liquid is then well stirred, and blood or albuminates are added. Heat is now applied up to almost the boiling-point, during which time the decomposition of the nitrates takes place, as well as the coagulation of all the albuminous substances, while the insoluble liberated oxide of zinc has taken up a greater part of the coloring matter, and is now firmly held by the coagulated albumen. The result is a bright, clear, and highly decolorized liquor, easily separated from the precipitate by a mechanical filtration. After this mechanical filtration has been proceeded with the solution is filtered through bone-black, which very easily removes the last traces of coloring matter and other earthy or inorganic impurities. After this operation the liquor is boiled down in vacuum-pans or otherwise, and, after being crystallized, is purged in centrifugal machines or in molds, the resulting product being a very pure and bright refined sugar.

For the treatment of recently-expressed cane, beet-root, or other saccharine juices the following mode of proceeding may be adopted: The juice is tested for acidity with litmus paper, and if found to react acid an amount of milk of lime may be added to the juice sufficient to render it neutral or slightly alkaline. Then a small quantity of a nitrate is added, preferably a neutral or basic nitrate of zinc. The quantity of nitrate of zinc to be used can be very small, amounting to even less than one-tenth of one per cent. of the solid saccharine matter contained in the juice. Heat is then applied to the juice or saccharine solution. Before the juice has reached its boiling-point the impurities—albuminous, amylaceous, &c.—will be coagulated, and will have risen to the surface in the form of a scum, which is to be skimmed off or otherwise separated from the clear liquor. The clear saccharine liquor is then concentrated, and if during concentration or evaporation any more coagulation should take place it would be preferable to separate it once more. When the solution has been reduced by evaporation to about 30° Baumé the last traces of coloring matter, as well as the inorganic impurities, can be extracted by filtration through animal charcoal. It will be found that the resulting product, whether the liquor has been filtered through bone-black or not, is of a very light and bright color, with all the characteristic qualities of a superior article.

I do not claim, broadly, the defecation or decolorization of saccharine solutions; nor do I claim the use of albuminous substances, alkalies, or bone-black, as each of the substances is used in the manufacture and refining of sugars, either separately or conjointly; but

What I claim as my invention, and desire to secure by Letters Patent of the United States, is—

1. The process of treating saccharine liquids to defecate and decolorize the same, which consists in mixing nitrates therewith, as set forth.

2. The process of treating saccharine liquids to defecate and decolorize the same, which consists in mixing neutral nitrate of zinc therewith, as specified.

3. The process of defecating and decolorizing saccharine solutions, which consists in mixing therewith, as set forth, a nitrate, preferably neutral nitrate of zinc, and organic matter, all as described.

4. The process of defecating and decolorizing saccharine liquids, in which an alkaline nitrate or a nitrate of an alkaline earth is employed, which consists in mixing such nitrate with the liquid, and subsequently filtering the mixture through bone-black to cause such nitrate to exert its effect, as set forth.

In testimony that I claim the foregoing as my own I affix my signature in presence of two witnesses.

JACOB WILLIAM DECASTRO.

Witnesses:
ORAZIO LUGO,
GEO. M. LOCKWOOD.